(12) United States Patent
Ramakrishnan et al.

(10) Patent No.: US 8,307,010 B2
(45) Date of Patent: Nov. 6, 2012

(54) DATA FEATURE TRACKING THROUGH HIERARCHICAL NODE SETS

(75) Inventors: Chandru Ramakrishnan, Raleigh, NC (US); Craig Harry, Redmond, WA (US); Mario A. Rodriguez, Raleigh, NC (US); Tan Phan, Raleigh, NC (US); Jim Presto, Raleigh, NC (US)

(73) Assignee: Microsoft Corporation, Redmond, WA (US)

( * ) Notice: Subject to any disclaimer, the term of this patent is extended or adjusted under 35 U.S.C. 154(b) by 749 days.

(21) Appl. No.: 12/238,877

(22) Filed: Sep. 26, 2008

(65) Prior Publication Data
US 2010/0083230 A1    Apr. 1, 2010

(51) Int. Cl.
*G06F 9/44*    (2006.01)
*G06F 17/30*    (2006.01)

(52) U.S. Cl. ......... 707/797; 707/956; 717/122; 717/128

(58) Field of Classification Search ............... 717/122, 717/128; 707/695, 797, 956
See application file for complete search history.

(56) References Cited

U.S. PATENT DOCUMENTS

| | | | | |
|---|---|---|---|---|
| 4,912,637 | A * | 3/1990 | Sheedy et al. ................ | 1/1 |
| 5,574,898 | A * | 11/1996 | Leblang et al. ............... | 1/1 |
| 5,649,200 | A * | 7/1997 | Leblang et al. ............... | 717/122 |
| 5,675,802 | A | 10/1997 | Allen et al. | |
| 6,321,369 | B1 * | 11/2001 | Heile et al. .................... | 716/102 |
| 6,385,768 | B1 | 5/2002 | Ziebell | |
| 6,449,624 | B1 * | 9/2002 | Hammack et al. ............. | 1/1 |
| 7,313,792 | B2 | 12/2007 | Buban et al. | |
| 7,409,679 | B2 * | 8/2008 | Chedgey et al. .............. | 717/144 |
| 7,634,566 | B2 * | 12/2009 | Turner et al. ................... | 709/226 |
| 2006/0031686 | A1 * | 2/2006 | Atallah et al. ................. | 713/190 |
| 2006/0075000 | A1 * | 4/2006 | Kleewein et al. .............. | 707/203 |
| 2006/0288055 | A1 | 12/2006 | Johnson et al. | |
| 2007/0011654 | A1 * | 1/2007 | Opperman ..................... | 717/122 |

OTHER PUBLICATIONS

Whitehead Jim . "DeltaV: Adding Versioning to the Web", Retrieved at <<http://www.webdav.org/deltav/WWW/10/deltav-intro.htm>>, Jul. 29, 2008, pp. 1-9.
"Why Distributed Version Control", Retrieved at <<http://wincent.com/a/about/wincent/weblog/archives/2007/10/why_distributed.php>>, Oct. 21, 2007, pp. 1-4.
McCormack Drew, "Who's that Girl?", Retrieved at <<http://www.macresearch.org/whos-gir>>, Nov. 26, 2007, pp. 1-5.

(Continued)

*Primary Examiner* — Jorge A Casanova
(74) *Attorney, Agent, or Firm* — Microsoft Corporation

(57) ABSTRACT

A data set may be represented as a hierarchical node set, comprising interrelated nodes that respectively include various data features (e.g., versions in a version-controlled software architecture.) Queries may be formulated regarding the inclusion of a particular feature in the nodes of the hierarchical data set ("does this node include this data feature?" and "what is the path of the data feature through the node set?") Such queries may be evaluated by identifying a source node that includes the data feature, identifying candidate merge paths from the source node to the taget node, and determining whether the nodes of any candidate merge path include the data feature. The results may be presented to the user, e.g., as a visual layout of the portion of the hierarchical node set that includes the data feature or a timeline of nodes illustrating the path of the data feature over time.

20 Claims, 5 Drawing Sheets

OTHER PUBLICATIONS

"Automatic Branch Merging with SVNMerge on Subversion", Retrieved at <<http://proxiblog.wordpress.com/2007/02/21/automatic-branch-merging-with-svnmerge-on-subversion/>>, Feb. 21, 2007, pp. 1-4.

"RoboSource Control Views Branches, Pinning, and File Histories", Retrieved at <<http://help.adobe.com/en_US/RoboSourceControl/7.0/RoboSource_Control_Help/RoboSource_Control_31_Familiarization/RoboSource_Control_fundamentals/ngfun5.htm>>, Jul. 29, 2008, pp. 1-2.

"Help Us Improve Branch and Merge", Retrieved at <<http://blogs.msdn.com/checkout/archive/2004/09/23/233622.aspx>>, Jul. 29, 2008, pp. 1-8.

Poole Damon, "Productivity Gains with AccuRev vs. ClearCase", Retrieved at <<http://www.accurev.com/software-configuration-management-resources/productivity_gains_ac_vs_cc.pdf>>, pp. 1-10.

* cited by examiner

DATA FEATURE TRACKING THROUGH HIERARCHICAL NODE SETS

BACKGROUND

In many computing contexts, a data set may change in a series of versions, wherein each version represents an addition, deletion, and/or modification of one or more data features as compared with related versions. For example, a version-controlled software architecture may be developed through many versions. While developing a new version from a preceding version, a developer may add a new source code feature, remove a source code feature, and/or change a source code feature. Such alterations may be made by the developer directly from the preceding version, and/or may be imported from one or more related versions, and may be arranged into branches representing significant developments of the data set. The versions of such a dynamic data set may therefore resemble a directed graph of relationships; e.g., a first version may descend from a second version, import a data feature from a related third version in a branch, and include a newly created data version that is later copied into a related fourth version.)

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Data sets may be represented as a hierarchical node set, comprising nodes representing respective versions and relational links that represent the relationships thereamong. For example, the hierarchical node set may be stored in a relational database as a set of relationally linked records that represent related nodes, or in a hierarchically structured document, such as an XML document. The representation of the data set as a hierarchical node set organized in such a manner may facilitate the application of location operations, such as queries devised to explore or modify the data set (e.g., by adding a new version of the data set, or by finding versions matching a particular criterion.)

However, in a data set represented in this manner, it may be difficult to explore changes to particular data features. While a relationship between two nodes (representing two versions) suggests at least some sharing of data features, it may not represent or reveal which data features are present in either node, and/or which data features differ between the nodes. For example, an earlier version of a software architecture may be represented as related to a later (i.e. directly following) version of the software architecture, but a basic representation of the versions may not include a comparison of the versions to discern which data features (such as bug fixes) were added to, changed in, or removed from the later version with respect to the earlier version. As a result, a developer seeking such information may have to resort to less sophisticated tools, such as manual inspection, diff-based raw comparisons, and release notes or other human-readable documentation.

Automated techniques may be devised for determining whether a particular node (a "target node") in the hierarchical node set includes a particular data feature, and how it came to be included in the target node. Such automated techniques may involve identifying a node that is known to contain the data feature (a "source node"), identifying candidate merge paths from the source node to the target node, and then identifying whether the nodes of any candidate merge path include the data feature, resulting in the identification of a merge path. If this tracking identifies such a merge path, the target node may be determined to contain the data feature, and a possible data feature history may be presented; if not, the target node may be determined to not contain the data feature. Many similar types of inquiries about the inclusion of data features in various nodes of the hierarchical node set may be answered (e.g., "when was a particular data feature included in a particular version first introduced?", "why was a particular feature added to a particular version?" and "how many times has a particular data featured been changed in a particular line of development?") Moreover, the inclusion and exclusion of the data feature in various merge paths through the hierarchical node set may be presented in a layout, such as a visual layout like a timeline, to produce an easily understandable representation of the migration of a data feature through the hierarchical node set.

To the accomplishment of the foregoing and related ends the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
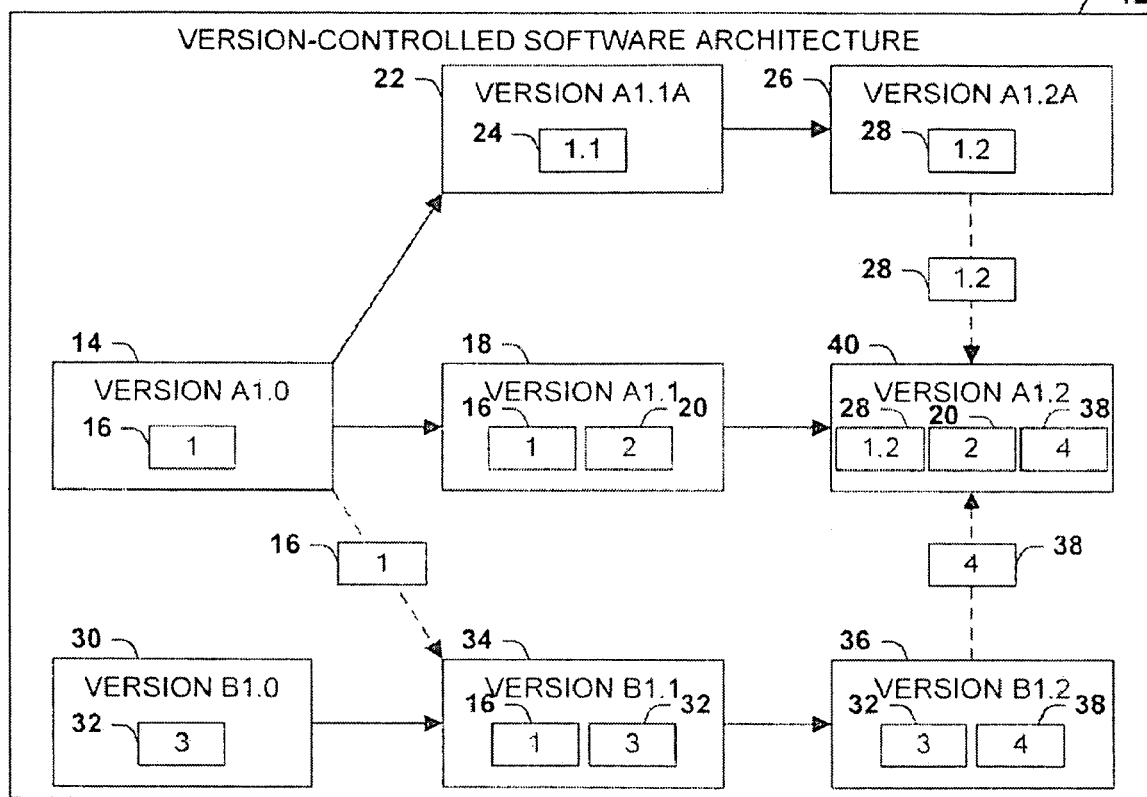
FIG. 1 is an illustration of an exemplary hierarchical node set representing a version-controlled software architecture.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Many types of data sets involve versioning, where the data set changes over time and is stored in a manner that allows tracking and maintenance. The changes to a data set may involve a set of data features that may be added to a version, modified in a version, and/or removed from a version with respect to a related version. As a first example, a developer may begin with a first version and then makes one or more changes to the data set that lead to a second version that descends from the first version. As a second example, a developer may merge a first version with a second version to produce a third version (e.g., by simply combining the data features of the first version and the data features of the second version, or by combining a first subset of data features of the first version and a second subset of data features of the second version.) More significant developments in the data set may be represented as a branch of related nodes that comprise the development. In this manner, a data set may change over many versions and through many branches that together comprise a version history of the data set.

One scenario in which such techniques may arise is a version-controlled software architecture, wherein one or more developers author a software architecture for a particular project using a tool that is capable of storing a snapshot of the current state of the software architecture as a version (e.g., by storing a copy of all source files, resources, and compiled executables.). Such versioning is useful for returning to a particular state of the software architecture. Such versioning may also facilitate the concurrent or consecutive development of multiple branches of the software architecture, such as a first set of versions oriented and configured for a first platform (such as a 32-bit processor) and a second set of versions oriented and configured for a second platform (such as a 64-bit processor), or a first version having a first set of software architecture capabilities and a second version having a second set of software architecture capabilities. The project may "fork" by creating a new line of development, and the version-controlled system may create a new branch of versions for the new development line. Respective versions may therefore be treated as having a particular set of data features, any of which may be ported among versions of the software architecture.

FIG. 1 illustrates an exemplary scenario 10 of a version-controlled software architecture 12 to which the techniques discussed herein may be applied. The exemplary scenario 10 comprises a first version 14 ("version A1.0") having a first data feature 16, e.g., a particular capability of the classes, methods, user interfaces, or resources such as data stores. The first version 14 gives rise to a second version 18 ("version A1.1") that retains the first data feature 16 and adds a second data feature 20. However, the first version 14 also gives rise to a branch, beginning with an offshoot second version 22 ("version A1.1A") that inherits the first data feature 16, but wherein the first data feature 16 is modified to produce an offshoot first data feature 24. For example, the "version A.A" branch beginning with the offshoot second version 22 may represent an experimental change to the software architecture that may be developed and refined through the versions of the offshoot second version 22 [e.g., through the addition of an offshoot third version 26 ("version A1.2A") comprising a second offshoot first data feature 28] without comprising the stability of the main line of development of the software architecture 10. (As illustrated herein, a second version that descends from a first version is illustrated with a solid-line relationship, while a second version that merely imports one or more data features a first version is illustrated with a dotted-line relationship.)

The exemplary scenario 10 also features another branch of development that is related to the software architecture 10 represented in FIG. 1, beginning with a first version 30 ("version B1.0") that includes a third data feature 32 and continuing through a second version 32 ("version B1.1") also having the third data feature 32 in an unmodified form. However, the second version 32 of the second branch imports the first data feature 16 of the first version 14 in the main line of development, and thereby combines the feature sets of the two development lines. However, this first data feature 16 may then be omitted in a subsequent version [e.g., a third version 36 ("version B1.2") of the "B" branch, which also includes a new fourth data feature 38.] For example, developers may discover that the first data feature 16 conflicts with the third data feature 32, and may therefore devise a new solution that involves a rewritten behavior that supplants the first data feature 16 with an implementation that is compatible with the third data feature 32. Finally, the two branches of development and the experimental branch of the "A" branch may merge to produce a third version 40 of the main line of development, which descends from the second version 18 and includes the second data feature 20, but which also supplants the first data feature 16 with the second offshoot first data feature 28 (imported from the offshoot third version 26), and which imports the fourth data feature 38 from the a third version 36 of the second line of development. Accordingly, the latest version illustrated in this exemplary scenario 10 includes both the data features of the experimental branch and the "B" branch of the software architecture, yet may have been developed in a stable manner outside of the other branches of development through the use of a version-controlled development tool. Moreover, the complex relationship among these versions may or may not be represented in the version-controlled development tool (e.g., the series and origin of respective versions may be recorded, or the tool may simply create a new date-stamped folder and copy the components of the software architecture there.)

Within a data set (such as the exemplary version-controlled software architecture 12 of FIG. 1), a user (such as a developer) may develop many types of queries relating to a particular version (a "target version") in the version history. For example, a developer may wish to find a version that contains a particular data feature. It may also be of interest to a user to determine when or why a data feature was added to a version, or to view the history of the data feature included in a series of versions. Many types of inquiries may be devised with respect to one or more data features included in some of the versions comprising a version history of a data set.

However, it may be difficult for a developer to evaluate such queries. As a first example, it may be difficult to represent versions in a data set as having sets of data features, because an automated process may have difficulty differentiating which aspects of the data set comprise different data features. Moreover, a data feature may be identified by a user on an ad hoc basis (e.g., a developer may identify a set of instructions as a bug, and may wish to track its inclusion as a data feature among the version history to identify which versions are affected), and such ad hoc identifying may be more difficult to track through a version history than a data feature expressly identified by a developer upon creating a version. As a second example, the data set may include a large set of versions, and scanning all of them for a particular data feature might be inefficient or infeasible. As a third example, if several versions contain a particular data feature, it may be difficult to determine the relationships of the versions and/or the migration path of the data feature through the version history if the version history does not adequately represent the relationships thereamong. Accordingly, the evaluation of whether a particular node contains a particular data feature may be computationally expensive, and a broad-scale survey identifying nodes that contain the data feature may involve a prohibitively lengthy evaluation.

Alternative solutions may be devised for organizing the versions of a data set to facilitate the application of queries on the versions of the data set, such as the tracking of a data feature, in a more efficient manner. In particular, such alternative solutions may endeavor to reduce the number of nodes evaluated for inclusion of the data feature. The versions of the data set may be represented as nodes of a hierarchical node set, wherein each node may descend from a parent node and may have one or more child nodes, and where respective nodes may also be related to other nodes (e.g., a data feature from a first node may be exported into a second node that is not a child of the first node.) The representation of the versions in a hierarchical node set may promote the identification of relationships among the versions, such as a timeline of development.

Representing the versions of the data set as a set of nodes of a hierarchical node set may promote the tracking of a data feature through the version history, which may be easier than with other representations of the version history. For example, a user may wish to investigate whether a particular data feature has been implemented in a target node of the hierarchical node set. An automated tracking of the data feature may be performed by identifying a first node (a "source node") in which the data feature exists, then identifying candidate merge paths of nodes from the source node to the target node, and then limiting the data feature evaluation to the nodes of such candidate merge paths. This iterative search may continue e.g., until a merge path is identified from the source node to the target node that comprises a path of related nodes that include the data feature, or until the set of candidate merge paths is fully searched without finding a path to the target node or a merge path of nodes that contain the data feature. The results of the iterative search may then be presented, e.g., as an answer to the query ("does this target node include this data feature?"), or as a timeline of related node in the merge path that illustrate the tracking of the data feature from the source node to the target node, or as a graphical depiction of a portion of the hierarchical node set with indications as to which nodes include the data feature. In this manner, the automated tracking and identification of a data feature among nodes of the hierarchical node set may be promoted.

Figure 2:
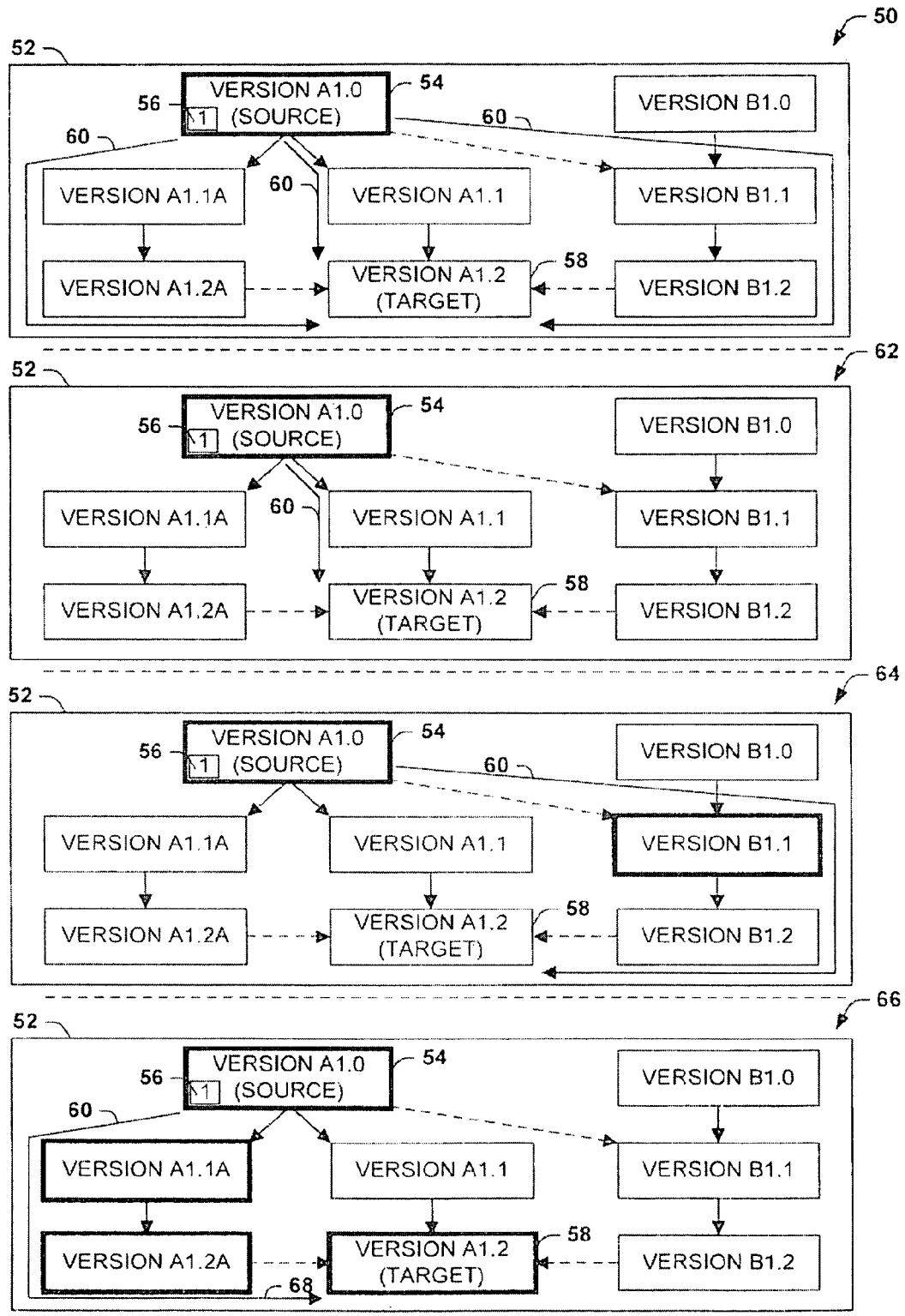
FIG. 2 is an illustration of an iterative search that tracks a data feature through the hierarchical node set.

FIG. 2 illustrates the version history as in the software architecture 12 in the exemplary scenario 10 of FIG. 1 organized as a hierarchical node set 58, again with solid arrows indicating a parent node and a child node that also represent a version and a directly descending subsequent version. In the scenarios illustrated in FIG. 2, a user wishes to evaluate whether a data feature 56 (in this case, first data feature 16) is included a target node 58 (in this case, version 1.2.) An automated search may be performed to identify candidate merge paths comprising paths of nodes from a source node 54 to the target node 58, and then identifying at least one merge path among the candidate merge paths where all of the nodes include the data feature 56.

In the first search state 50 of FIG. 2, the automated search identifies a source node 54 that contains the data feature 56. (In this figure, nodes identified as containing the data feature 56 are illustrated with a thick border.) The automated search confirms that the source node 54 contains the data feature 56, and then identifies candidate merge paths 60 from the source node 54 to the target node 58. Three such candidate merge paths are identified: a first candidate merge path from the source node 54 through the main development branch (through version A1.1) to the target node 58; a second candidate merge path from the source node 54 through the second branch (through version V1.1 and version B1.2) to the target node 58; and a third candidate merge path from the source node 54 through the experimental branch (through version A1.1A and version A1.2A) to the target node 58.

In the second search state 62 of FIG. 2 the automated search examines the first candidate merge path to determine whether the nodes of this candidate merge path 60 include the data feature 56. The automated search examines the node identified as Version A1.1, and determines that it does not include the data feature 56, so the candidate merge path 60 is excluded from consideration.

In the third search state 64 of FIG. 2, the automated search similarly examines the second candidate merge path to determine whether the nodes of this candidate merge path 60 (through the second branch) include the data feature 56. The automated search examines node determines that the node identified as Version B1.1 includes the data feature 56, but that the subordinate node identified as Version B1.2 does not contain the data feature 56. Therefore, the automated search excludes the candidate merge path 60 from consideration.

In the fourth search state 66 of FIG. 2, the automated search examines the third candidate merge path. The search identifies the data feature 56 as includes in Version A1.1A and Version A1.2A as well as in the target node 58. The search therefore selects this candidate merge path 60 as a merge path 68 from the source node 54 to the target node 58. The automated search might stop upon identifying a merge path 68, or might continue to try to identify another merge path 68 from the remaining set of candidate merge paths 60; however, no candidate merge paths 60 remain to be examined after the fourth search state 66, and so the search ends with the selection of the merge path 68.

Figure 3:
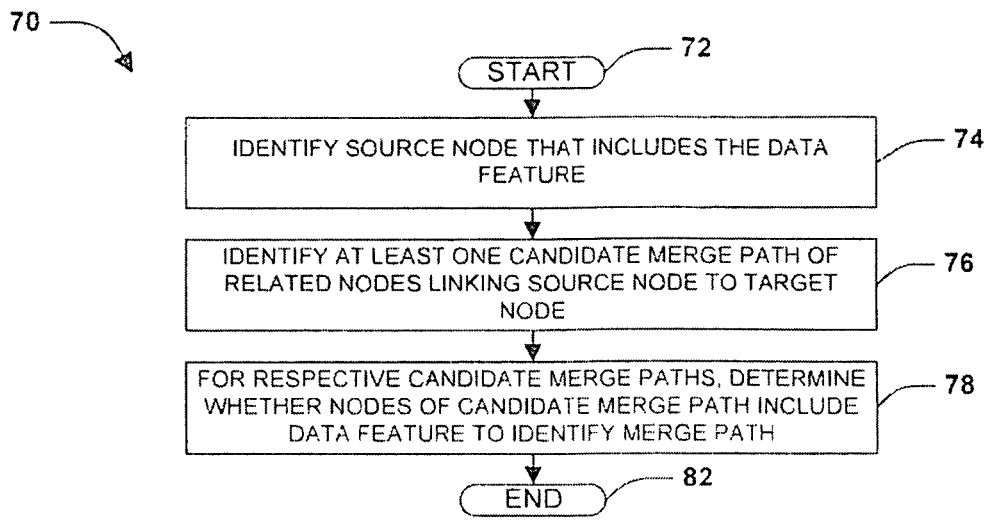
FIG. 3 is a flow chart illustrating an exemplary method of determining an inclusion of a data feature in a target node of a hierarchical node set.

FIG. 3 presents a first embodiment of these search techniques, comprising an exemplary method 70 of determining an inclusion of a data feature 56 in a target node 58 of a hierarchical node set 52. The exemplary method 70 begins at 72 and involves identifying 74 a source node 54 that includes the data feature 56. The exemplary method 70 also involves identifying 76 at least one candidate merge path 60 of related nodes linking the source node 54 to the target node 58, and for respective candidate merge paths 60, determining 78 whether the nodes of the candidate merge path 60 include the data feature 56 to identify a merge path. Having identified a candidate merge path 60 from the source node 54 to the target node 58 comprising a merge path of related nodes that include the data feature 56, the exemplary method 70 thereby determines the inclusion of the data feature 56 in the target node 58, and so ends at 80.

Figure 4:
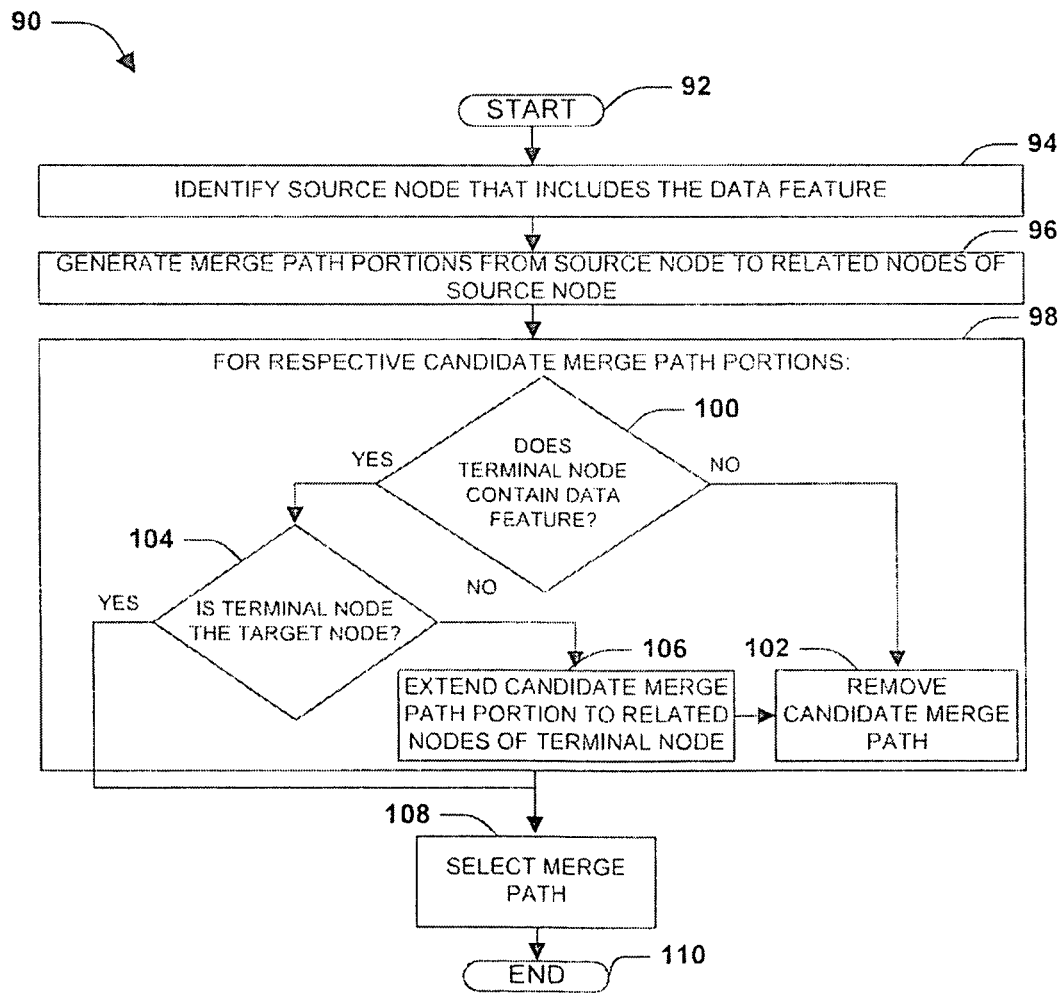
FIG. 4 is a flow chart illustrating another exemplary method of determining an inclusion of a data feature in a target node of a hierarchical node set.

FIG. 4 presents a second embodiment of these search techniques, comprising an exemplary method 90 that is similar to the exemplary method 70 of FIG. 3, but formulated in an iterative manner. The exemplary method 90 of FIG. 4 begins at 92 and again involves identifying 94 a source node 54 that contains the data feature 56. The exemplary method 90 then generates candidate merge path portions from the source node 54 to related nodes of the source node 54 (where respective candidate merge path portions represent a portion of a candidate merge path that does not yet extend to the target node 58.) The identified candidate merge path portions may be stored, e.g., in a collection (such as a search queue) of candidate merge path portions to be evaluated as part of the iterative process: e.g., the identifying 96 of candidate merge path portions may result in placing the candidate merge path portions in the search queue. While at least one candidate search path portion remains to be evaluated, an iterative evaluation 98 may occur for such candidate search path portions. The iterative evaluation 98 involves identifying 100 whether the terminal node of the candidate search path portion includes the data feature 56. If the terminal node does not contain the data feature 56, the iterative evaluation 98 branches after the identifying 100 to removing 102 the candidate search path portion from further evaluation. However, if the terminal node of the candidate search path portion does contain the data feature 56, the iterative evaluation 98 involves identifying whether the terminal node is the target node 58. If the terminal node is the target node 58, the iterative evaluation 98 may end (e.g., with a break control flow statement) and the exemplary method 90 may continue at 108. If the terminal node is not the target node 58, the iterative evaluation 98 may involve extending 106 the candidate merge path portion to related nodes of the terminal node of the candidate merge path portion, thereby generating additional candidate search path portions that may be evaluated in further iterations of the iterative search. The iterative evaluation 98 may continue until no candidate search path portions 66 remain to be evaluated (e.g., when the search queue is empty.) After the iterative evaluation 98, the exemplary method 90 may involve determining 108 whether a merge path has been identified that extends from the source node 54 to the target node 58 through a series of related nodes that include the data feature 56. Having so fulfilled the query, the exemplary method 90 ends at 110.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 70 of FIG. 3) to confer individual and/or synergistic advantages upon such embodiments.

A first aspect that may vary among embodiments of these techniques relates to the scenarios in which the techniques may be utilized. The techniques involve a data set that may be represented as a hierarchical node set 58 comprising a set of interrelated nodes respectively representing a version of the data set that includes a set of data features. These techniques may be applied to many data set scenarios, such as a versioned data store (such as a database or XML-structured document) or a representation of a network or a set of interconnected devices. As illustrated in FIG. 1 and FIG. 2, the hierarchical node set 58 may represent a version-controlled software architecture, and the nodes may represent versions of the software architecture, such as may be captured and/or managed by a version-controlled system or development tool. The data feature 56 may represent a source code alteration, which may be determined by scanning the contents of a version of the software architecture. In a more specific embodiment, the data feature 56 may comprise at least one instruction, and determining whether a node contains the data feature 56 may involve determining whether the version includes the at least one instruction of the data feature 56 (e.g., whether the instruction appears in a completely or substantially unaltered form.) It may be appreciated that a degree of flexibility may be included in the comparison e.g., a data feature 56 may comprise a particular set of instructions in a particular order, such that a version only includes the data feature if the instructions are present in an unaltered form and in the specified order. As a first alternative, a version may be found to include the data feature 56 if a substantially similar block of instructions are included (e.g., some changes may be tolerable without altering the status of the instruction block as an instance of the data feature 56.) As a second alternative, the data feature 56 may also comprise a marker that semantically marks block of instructions as comprising the data feature 56, and a version may be found to include the data feature 56 if it includes a block of instructions marked with such a marker (regardless of the instructions so marked.) Those of ordinary skill in the art may devise many scenarios to which the techniques discussed herein may be applied.

A second aspect that may vary among embodiments of these techniques relates to the manner of representing nodes in the hierarchical node set 58 to which these techniques are applied. It may be appreciated a hierarchical node set 58 may be organized, stored, and accessed in many ways, some of which may provide additional advantages and/or reduce disadvantages with respect to other ways of storing the same hierarchical node set 58. As a first example, the hierarchical node 58 set may be stored in a node repository, such as a relational database or an indexed structure. Upon receiving a new node that is subordinate to a superior node (e.g., a subsequent version of a software architecture that descends from a prior version), the techniques may involve recording the new node in the node repository as subordinate to the superior node. In one such embodiment, the recording may involve a node record, which may comprise (e.g.) a name of the node, the contents of the node, a description of the node, and/or at least zero superior nodes of the node (e.g., a one-to-one relationship, a one-to-many relationship, a collection of references to superior nodes, etc.) The relationships between the node with other nodes may also be recorded; e.g., if the node includes a data feature 56 imported from another node, a relationship may be established to indicate the relationship. Moreover, upon receiving the new node, the data repository may also track the data features 56 of respective nodes. For example, upon receiving the new node, the data features 56 included in the node may be identified and recorded the data features included in the new node in the node repository, and identifying a node during a search may involve including the data feature 58 may involve examining the node repository to determine the inclusion of the data feature 58 in the node. This storing of data features 56 in the node repository for respective nodes may also include representing a source of the data feature 56; e.g., the recording in the node repository may include a reference to the related node that contributed at least one data feature 56 to the new node. Those of ordinary skill in the art may devise many ways of storing, organizing, and accessing the hierarchical node set 58 while implementing the techniques discussed herein.

A third aspect that may vary among embodiments of these techniques relates to the manner of searching the hierarchical node set 58 to identify candidate merge paths that include a specified data feature 56. As a first example, and as indicated in FIG. 4, the searching may be organized as an iterative search, which may involve a search collection (such as a search queue) of nodes that are to be investigated. Such a search may be organized, e.g., as a breadth-first search (where all of the candidate merge path portions are extended by one node to the related nodes of the terminal node before any extended candidate merge path portion is evaluated); as a depth-first search (where a first candidate search path portion is fully evaluated for extension through related nodes to the target node 58 before a second candidate search path portion is evaluated); a priority-based search (where more promising candidate search path portions are evaluated before less promising candidate search path portions); etc. As a second example, the identifying of candidate search paths may be completed before any node is examined for inclusion of the data feature 56. Alternatively, the identifying of candidate search paths may be performed concurrently with the examination of nodes for inclusion of the data feature 56 (e.g., by examining a terminal node of a candidate merge path portion for inclusion of the data feature 56 and extending the candidate merge path portion to the related nodes of the terminal node only if the terminal node includes the data feature 56.) This alternative process may be particularly advantageous for culling candidate merge path portions comparatively earlier in the automated search when a node of the candidate merge path portion is found not to include the data feature 56.

As a third example of this third aspect, such searches (both iterative and non-iterative) may be organized as a sequential search, where one candidate merge path portion is fully evaluated before another candidate merge path portion is evaluated, or as a parallel search, where candidate merge path portions may be concurrently evaluated by different threads, processes, or processors in a multiprocessing or multicore computing environment. As a fourth example, the searching may involve following related links in a specified direction (e.g., only examining nodes that precede the target node 58 in the version history, or only nodes that follow the source node 54 in the version history.) It may be appreciated that either the source node 54 may precede the target node 58, such that the searching may involve an examination of related nodes 66 that follow the source node 54, or the target node 58 may precede the source node 54, such that the data feature 56 is traced back through the version history toward the target node 58. Alternatively, the search may include all related nodes of a node that includes the data feature 56, regardless of whether such related nodes precede or follow the node.

As a fourth example of this third aspect, the searching may be embodied as an exhaustive search, wherein the searching continues either until the target node 58 is found to include the data feature 56 or until no more candidate merge path portions remain to be identified. While this searching may involve a searching of a large number of nodes if the hierarchical node set 58 is large and nodes have many relationships, it may be appreciated that this search may still be more efficient than an exhaustive search of the entire hierarchical node set 58. Alternatively, various conditions may be placed on the search in order to limit the scope of the search; e.g., the search may be permitted to run only for an evaluation of a preset number of nodes and/or candidate search path portions, or only for a particular amount of time, or only for nodes that are within a certain proximity of the target node 58 (e.g., candidate merge path portions having fewer than ten relational links of the target node 58 in the hierarchical node set 58.) Those of ordinary skill in the art may devise many types of searches of the hierarchical node set 58 that may be included in implementations of the techniques discussed herein.

Figure 5:
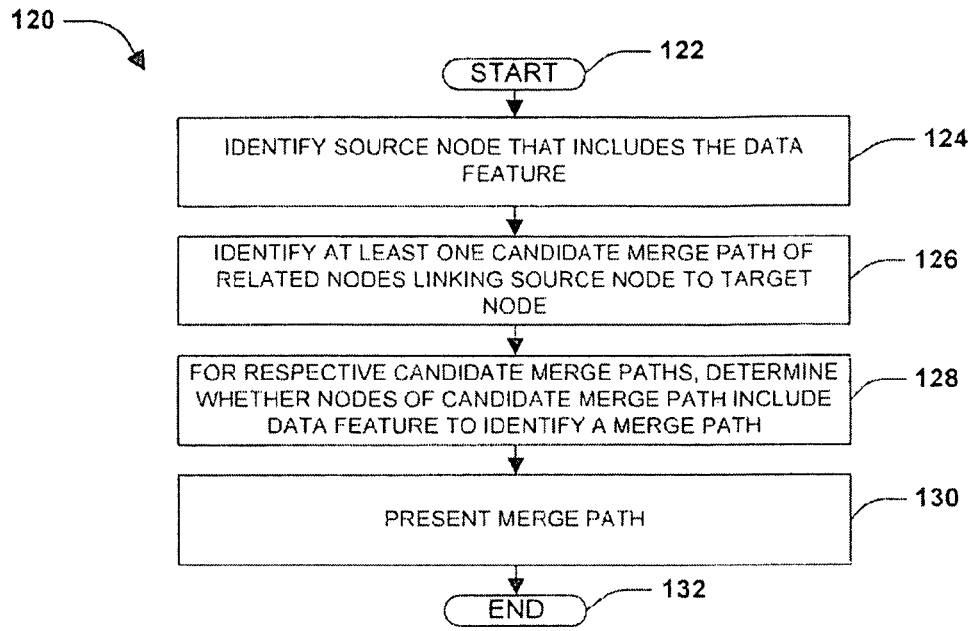
FIG. 5 is a flow chart illustrating an exemplary method of presenting nodes of a hierarchical node set that include a data feature

Additional embodiments of these techniques may involve a presenting of the hierarchical node set 58, such as a visual layout that may be presented to a user. FIG. 5 illustrates one such embodiment as an exemplary method 120 of presenting nodes in a hierarchical node set 58 with regard to a particular data feature 56. The exemplary method 120 begins at 122 and involves identifying 124 a source node 54 that includes the data feature 56. The exemplary method 120 also involves identifying 126 at least one candidate merge path of related nodes linking the source node 54 to the target node 56, and for respective candidate merge paths, determining 128 whether the nodes 66 of the candidate merge path include the data feature 56. The exemplary method 120 then involves presenting 130 the identified merge path. Having achieved the presenting of a relevant portion of the hierarchical node set 58 comprising a merge path of related nodes from the source node 54 to the target node 58 that include that data feature 56, the exemplary method 120 ends at 132.

Figure 6:
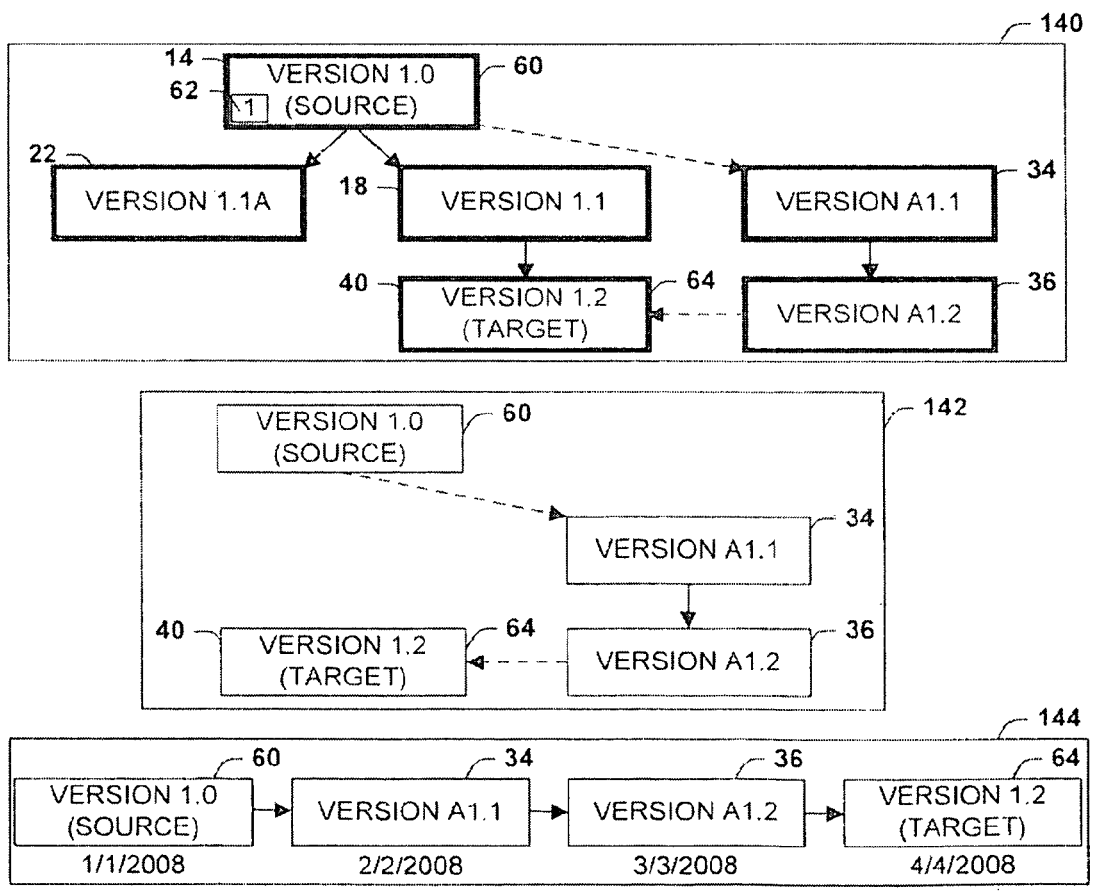
FIG. 6 is a set of visual layouts of a hierarchical node set relating to the inclusion of a data feature in particular nodes of the hierarchical node set.

The presenting 130 of nodes and the data feature 56 may take many forms. Some presentations may comprise, e.g., a data representation, such as an XML-structured document representing the structure of the portion of the hierarchical node set 58 (e.g., an excerpt of the nodes that include the data feature 56 and the relationships thereamong.) Alternatively, the presenting 130 may involve a visual representation, such as may be printed or displayed for a user. FIG. 6 presents some exemplary visual layouts of the nodes of the hierarchical node set 58 of FIG. 1 that indicate the inclusion of the data feature 56 in the version history of the hierarchical node set 58. The first visual layout 140 involves a hierarchical visual layout that indicates the superior and subordinate organization of the nodes of the hierarchical node set 58 that include the data feature 56. Other visual layouts may involve a layout oriented to reveal a tracking of the data feature 56 through the hierarchical node set 58 to a target node 58, e.g., in response to a query of whether a particular node includes the data feature 58 (such as may be identified according to the techniques discussed herein, such as the exemplary method 70 of FIG. 3 and the exemplary method 90 of FIG. 4.) The tracking may be presented, e.g., as an excerpt of the hierarchical data set 58 through which the data feature 56 is tracked from a source node 54 to the target node 58, such as in the second visual layout 142 of FIG. 6. Alternatively, the presentation may be organized to produce a timeline that indicates the order and/or time of development of the nodes through which the data feature 56 is tracked, such as in the third visual layout 144 of FIG. 6. The layout may depict the dates of development of the various nodes, such as the dates that such nodes were created and/or stored in a node repository. Those of ordinary skill in the art may devise many ways of presenting the hierarchical node set 58 in both visual and non-visual manners while implementing the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course those skilled in the art will recognize many modifications may be made to this configuration without departing from the scope or spirit of the claimed subject matter.

Figure 7:
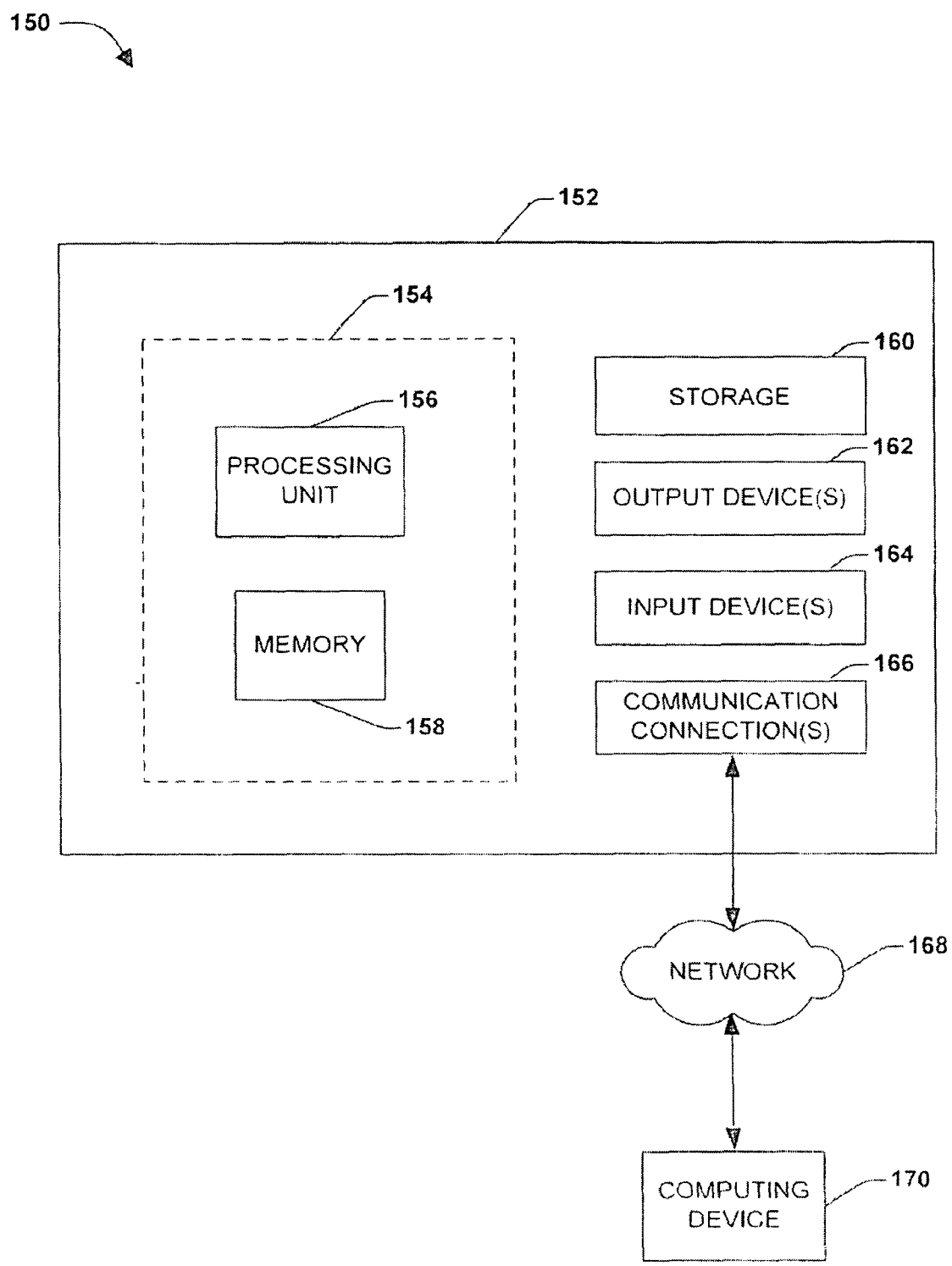
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 150 comprising a computing device 152 configured to implement one or more embodiments provided herein. In one configuration, computing device 152 includes at least one processing unit 156 and memory 158. Depending on the exact configuration and type of computing device, memory 158 may be volatile (such as RAM, for example), non-volatile (such as ROM, flash memory, etc., for example) or some combination of the two. This configuration is illustrated in FIG. 7 by dashed line 154.

In other embodiments, device 152 may include additional features and/or functionality. For example, device 152 may also include additional storage (e.g., removable and/or non-removable) including, but not limited to, magnetic storage, optical storage, and the like. Such additional storage is illustrated in FIG. 7 by storage 160. In one embodiment, computer readable instructions to implement one or more embodiments provided herein may be in storage 160. Storage 160 may also store other computer readable instructions to implement an operating system, an application program and the like. Computer readable instructions may be loaded in memory 158 for execution by processing unit 156, for example.

The term "computer readable media" as used herein includes computer storage media. Computer storage media includes volatile and nonvolatile, removable and non-removable media implemented in any method or technology for storage of information such as computer readable instructions or other data. Memory 158 and storage 160 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 152. Any such computer storage media may be part of device 152.

Device 152 may also include communication connection(s) 166 that allows device 152 to communicate with other devices. Communication connection(s) 166 may include, but is not limited to, a modem, a Network Interface Card (NIC), an integrated network interface, a radio frequency transmitter/receiver, an infrared port, a USB connection, or other interfaces for connecting computing device 152 to other computing devices. Communication connection(s) 166 may include a wired connection or a wireless connection. Communication connection(s) 166 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 152 may include input device(s) 164 such as keyboard, mouse, pen, voice input device, touch input device, infrared cameras, video input devices, and/or any other input device. Output device(s) 162 such as one or more displays, speakers, printers, and/or any other output device may also be included in device 152. Input device(s) 164 and output device(s) 162 may be connected to device 152 via a wired connection, wireless connection, or any combination thereof. In one embodiment, an input device or an output device from another computing device may be used as input device(s) 164 or output device(s) 162 for computing device 152.

Components of computing device 152 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 152 may be interconnected by a network. For example, memory 158 may be comprised of multiple physical memory units located in different physical locations interconnected by a network.

Those skilled in the art will realize that storage devices utilized to store computer readable instructions may be distributed across a network. For example, a computing device 170 accessible via network 168 may store computer readable instructions to implement one or more embodiments provided herein. Computing device 152 may access computing device 170 and download a part or all of the computer readable instructions for execution. Alternatively, computing device 152 may download pieces of the computer readable instructions, as needed, or some instructions may be executed at computing device 152 and some at computing device 170.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalents), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of determining an inclusion of a data feature in a target node of a hierarchical node set on a computer having a processor, the method comprising:
    executing on the processor instructions configured to:
        identify a source node that includes the data feature;
        identify a candidate merge path set comprising at least one candidate merge path of related nodes linking the source node to the target node through at least one intermediate node;
        identify a merge path for the data feature from the source node to the target node by, for respective candidate merge paths of the candidate merge path set, determining whether the nodes of the candidate merge path include the data feature; and
        upon identifying a merge path comprising nodes from the source node to the target node that include the data feature, identify the target node as including the data feature.

2. The method of claim 1:
the hierarchical node set representing a version-controlled software architecture;
the nodes representing versions of the software architecture; and
the data feature representing a source code alteration.

3. The method of claim 2:
the data feature comprising at least one instruction, and
determining whether a node includes the data feature comprising: determining whether the version includes the at least one instruction of the data feature.

4. The method of claim 1, comprising:
upon receiving a new node that is subordinate to a superior node, recording the new node in a node repository as subordinate to the superior node.

5. The method of claim 4, the recording comprising:
recording in the node repository a node record comprising:
    a name of the node;
    contents of the node;
    a description of the node; and
    at least zero superior nodes of the node.

6. The method of claim 4, comprising:
upon receiving the new node:
    identifying data features included in the new node, and recording the data features included in the new node in the node repository; and
    identifying a node including the data feature comprising:
        examining the node repository to determine the inclusion of the data feature in the node.

7. The method of claim 4, comprising: recording in the node repository at least one related node in a related branch that has contributed at least one data feature to the new node.

8. The method of claim 7, identifying the related nodes of a node comprising:
identifying subordinate nodes of the node, and
identifying related nodes that have received at least one data feature from the node.

9. The method of claim 1, identifying the at least one candidate merge path comprising:
generating at least one candidate merge path portion from the source node to related nodes of the source node; and
evaluating respective candidate merge path portions by:
    identifying related nodes of a terminal node of the candidate merge path portion;
    for respective related nodes:
        generating at least one additional candidate merge path portion from the source node through the terminal node to the related node; and
        upon identifying the target node among the related nodes, generating a candidate merge path from the source node through the terminal node to the target node.

10. The method of claim 9, evaluating the candidate merge path portions until one of:
a candidate merge path is identified, and
all candidate merge path portions have been evaluated.

11. A method of presenting a set of nodes in a hierarchical node set that include a data feature on a computer having a processor, the method comprising:
    executing on the processor instructions configured to:
        identify a source node that includes the data feature;
        identify a candidate merge path set comprising at least one candidate merge path of related nodes linking the source node to a target node through at least one intermediate node;
        identify a merge path for the data feature from the source node to the target node by, for respective candidate merge paths of the candidate merge path set, determining whether the nodes of the candidate merge path include the data feature; and
        upon identifying a merge path comprising nodes from the source node to the target node that include the data feature, present the nodes comprising the merge path that include the data feature.

12. The method of claim 11:
the hierarchical node set representing a version-controlled software architecture;
the nodes representing versions of the software architecture; and
the data feature representing a source code alteration.

13. The method of claim 12:
the data feature comprising at least one instruction, and
determining whether a node contains the data feature comprising: determining whether the version includes the at least one instruction of the data feature.

14. The method of claim 11, comprising:
upon receiving a new node that is subordinate to a superior node, recording the new node in a node repository as subordinate to the superior node.

15. The method of claim 11, identifying the at least one candidate merge path comprising:
generating at least one candidate merge path portion from the source node to related nodes of the source node; and
evaluating respective candidate merge path portions by:
identifying related nodes of a terminal node of the candidate merge path portion;
for respective related nodes:
generating at least one additional candidate merge path portion from the source node through the terminal node to the related node; and
upon identifying the target node among the related nodes, generating a candidate merge path from the source node through the terminal node to the target node.

16. The method of claim 11, the presenting comprising: displaying a visual layout of the at least one merge path.

17. The method of claim 16, the visual layout organized as at least one of:
a hierarchical visual layout illustrating superior and subordinate relationships among nodes of the at least one merge path, and
a timeline visual layout illustrating inclusion of the data feature in the nodes of the at least one merge path.

18. The method of claim 16, comprising:
identifying related nodes of the nodes including the data feature, and
presenting the related nodes in the visual layout.

19. The method of claim 11, comprising:
upon receiving a request to identify whether a target node includes the data feature:
determining whether the target node is among the identified related nodes; and
presenting the target node with the nodes indicating whether the target node includes the data feature.

20. A method of presenting a hierarchical node set representing a version-controlled software architecture and comprising a set of nodes that represent versions of the software architecture and that include a data feature representing a source code alteration, the hierarchical node set stored in a node repository, and the method comprising:
upon receiving a new node that is subordinate to a superior node:
identifying data features included in the new node, and
recording the new node in the node repository as subordinate to the superior node as a record comprising:
a name of the node,
contents of the node,
a description of the node, and
at least zero superior nodes of the node;
recording the data features included in the new node in the node repository; and
recording in the node repository at least one related node in a related branch that has contributed at least one data feature to the new node;
identifying a source node that includes the data feature by examining the node repository to determine the inclusion of the data feature in the source node;
generating at least one candidate merge path portion from the source node to related nodes of the source node; and
evaluating respective candidate merge path portions by:
identifying related nodes of a terminal node of the candidate merge path portion;
for respective related nodes:
generating at least one additional candidate merge path portion from the source node through the terminal node to the related node; and
upon identifying the target node among the related nodes, generating a candidate merge path from the source node through the terminal node to the target node,
until at least one terminal condition of a terminal condition set is satisfied, the terminal condition set comprising:
an identification of a merge path, and
an evaluation of all candidate merge path portions;
presenting at least one merge path as a visual layout of the nodes identifying related nodes of the nodes, and organized as at least one of:
a hierarchical visual layout illustrating superior and subordinate relationships among nodes, and
a timeline visual layout illustrating inclusion of the data feature in the nodes of the hierarchical node set.

* * * * *